Nov. 30, 1937.    L. G. KNAPP    2,100,603
CRANKCASE ASSEMBLY AND METHOD OF MAKING THE SAME
Filed Sept. 16, 1935    4 Sheets-Sheet 1
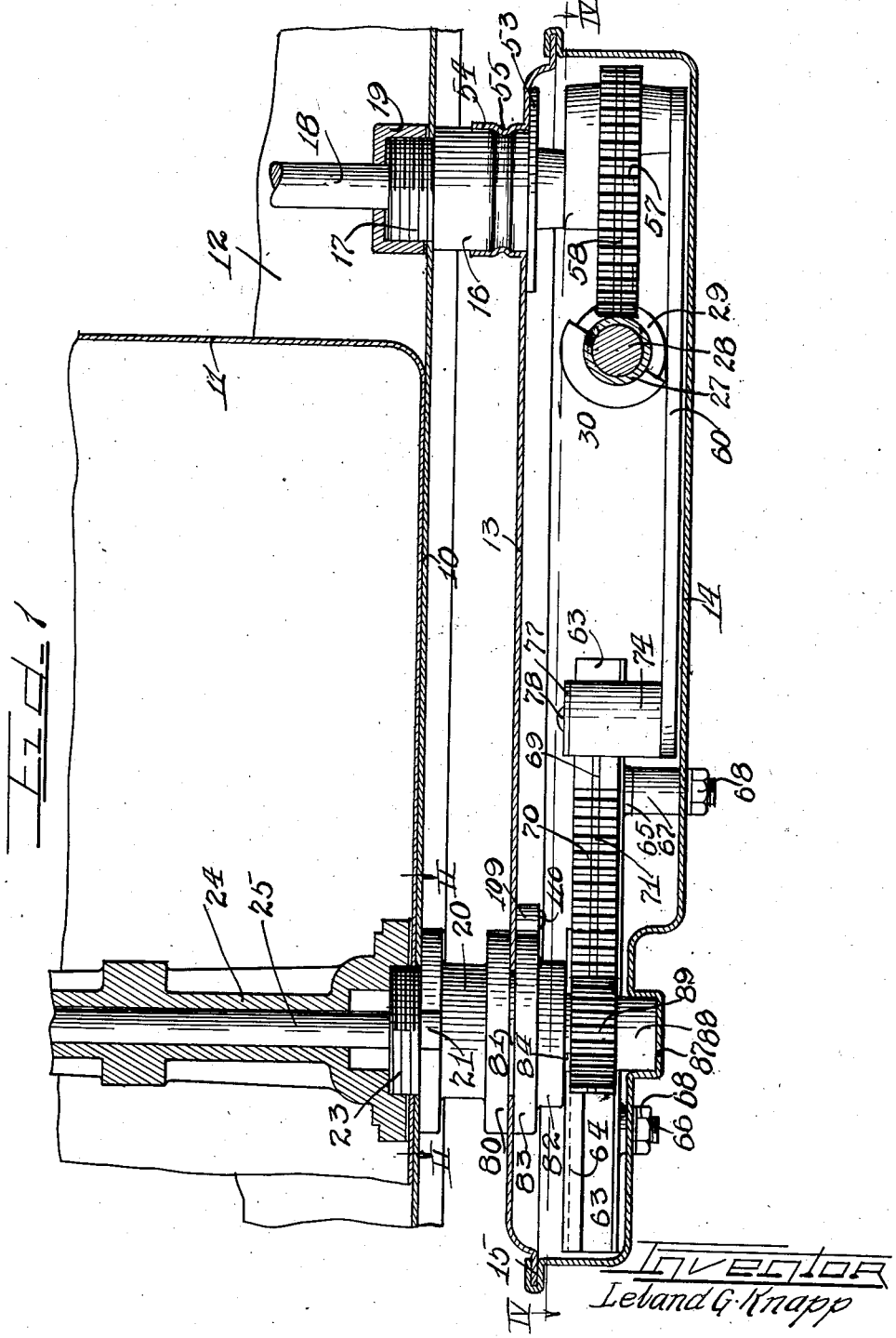

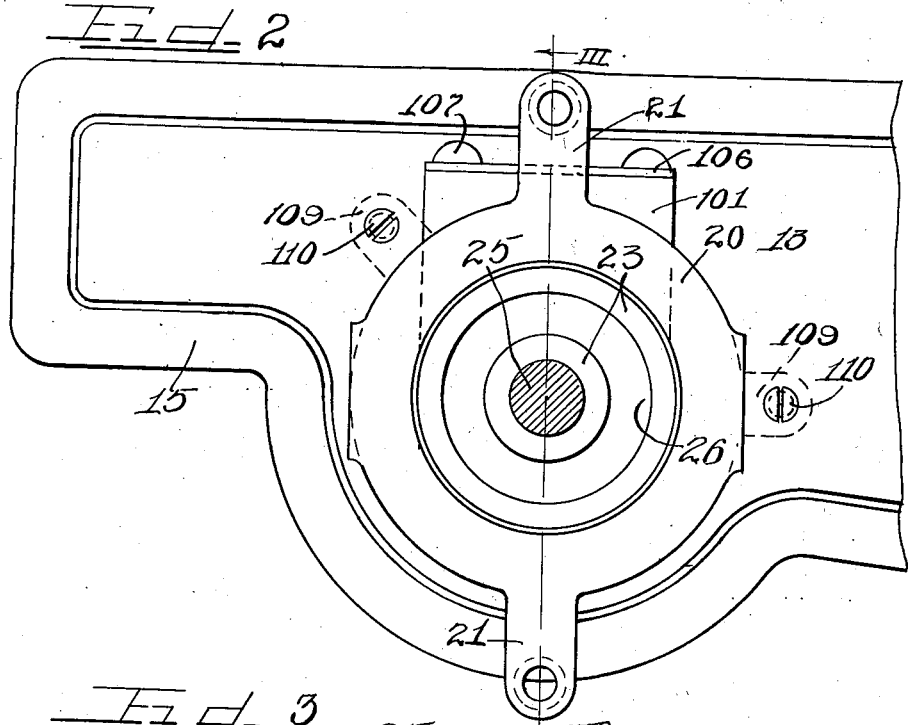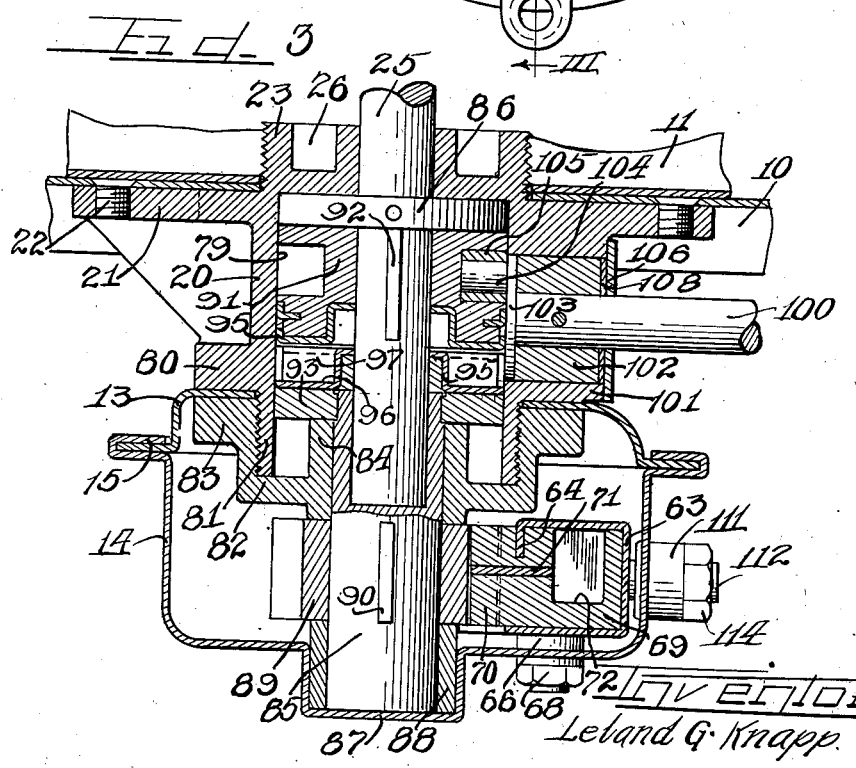

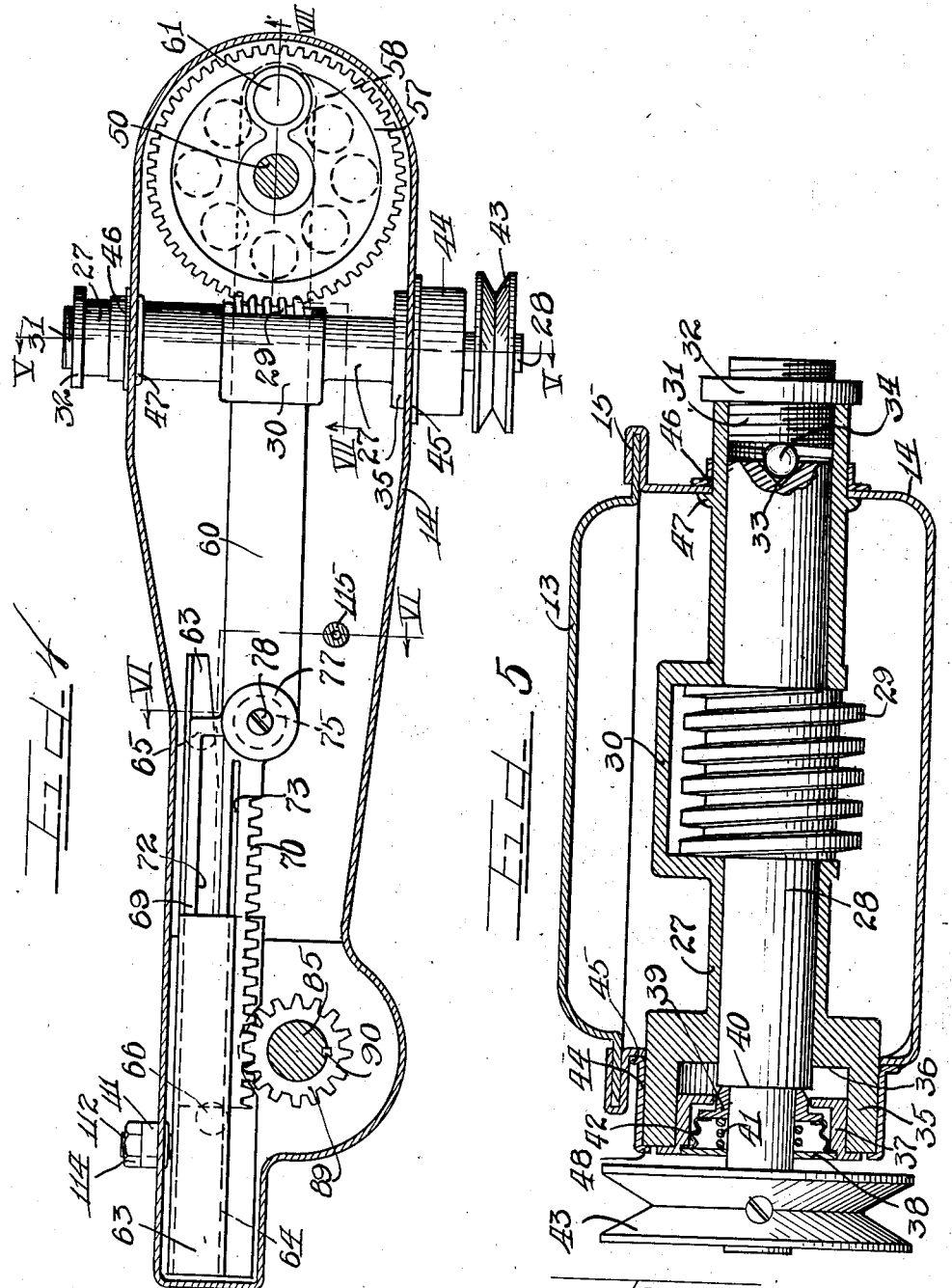

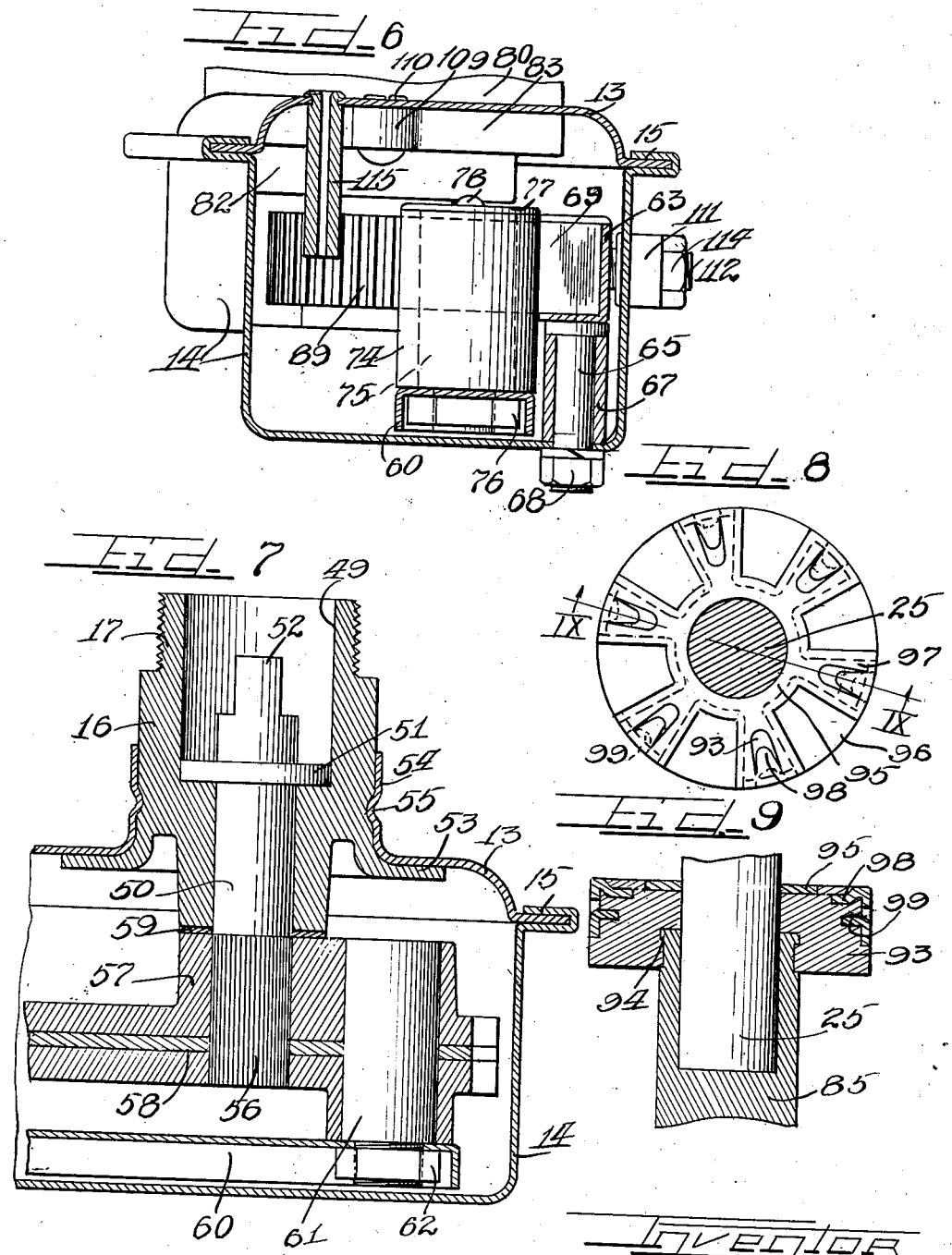

Patented Nov. 30, 1937

2,100,603

UNITED STATES PATENT OFFICE 2,100,603

CRANKCASE ASSEMBLY AND METHOD OF MAKING THE SAME

Leland G. Knapp, Chicago, Ill.

Application September 16, 1935, Serial No. 40,729

10 Claims. (Cl. 29—84)

This invention relates to improvements in a crank case and method of making the same, and more particularly to a crank case and driving mechanism for use in connection with a washing machine of the type commonly used in individual households for the laundering of wearing apparel and similar articles, although the invention may have other uses and purposes as will be apparent to one skilled in the art.

In the matter of washing machines, especially those designed for household purposes, a material item of expense in their manufacture resides in the crank case and associated mechanism. Economy in initial cost and ease of assembly in connection with a crank case and its associated operating parts have not as yet been realized to a desirable extent. Further, with washing machines of the character heretofore developed, in each instance of which I am aware, the power transmission means and casings therefor have been made into such an integral part of the machine as a whole that it was necessary to dismantle a goodly portion of the machine to make a simple repair and then reassemble the structure. Accordingly, if a part of the transmission mechanism was broken, the machine would of necessity stand idle not only during the time required to obtain a new part but also during the time required to reassemble a substantial part of the structure. In addition, in the past machines of this character have not been sufficiently foolproof in that the transmission means were accessible to unskilled users of the machine.

Of course, reasonable durability must not be sacrificed for the sake of economy, and it is an object of this invention to provide a very durable and extremely economical crank case and transmission construction highly desirable for use in connection with household washing machines.

Another object of the invention is the provision of a new and novel method of making and assembling such a crank case and transmission construction.

Another feature of this invention is the fact that the transmission and crank case construction are so arranged that the entire structure may be readily removed from the machine and as easily replaced by another structure, so that there will be no material interruption in the use of the machine. When repairs are needed or any of the parts are broken or out of order, it is contemplated that the user or an agent will merely remove the transmission construction, turn it in at the dealers for a similar mechanism, attach the substitute mechanism to the machine and proceed in using the machine, the construction being so economical as to warrant such a substitution of the crank case assembly.

Another object of the invention is the construction of a transmission and crank case of the character described herein wherein the crankcase is positively sealed and access to the transmission mechanism is prevented without mutilation of the crank case.

A further aim of this invention is the provision of a sealed-in crank case assembly containing a sufficient quantity of lubricant in which the working parts are wholly or partially submerged, the construction being such that in the event the entire crank case assembly unit is inverted, there will be no loss of lubricant, although a vent opening is provided.

Still another object of the invention is the provision of a crank case assembly, wherein transmission mechanism may be made up initially into sub-assemblies, and the sub-assemblies then placed into position to form the complete assembly.

Another feature of the invention resides in the fact that the entire transmission mechanism may be assembled in operative position part to the bottom and part to the cover of the crank case, after which the bottom of the crank case may be attached and sealed to the cover, and the entire unit may then be attached to the frame of the machine.

Still another feature of the invention is the provision of a crank case and transmission assembly wherein substantially all of the parts, with the exception of shafts, certain bearings and screw threaded members, may be formed by simple stamping operations or die-casting, thus eliminating the necessity of considerable machining operations.

In accordance with the general features of the invention, there is provided a crank case including a lid and a bottom, these parts being united by a lock-seam extending therearound, effectively sealing in the contents. Within the crank case, transmission mechanism is disposed, some of this mechanism extending out of the case in position for connection with the upper moving parts of a washing machine. The transmission mechanism may be put together in sub-assemblies, and these sub-assemblies mounted as units in the crank case. Two of the sub-assemblies are placed in position in the bottom of the crank case and the others are associated with the top of the crank case, the two pieces of the crank case being lock-seamed together after the transmission mechanism is in operative position. It is then a simple expedient to attach the entire crank case and transmission units to the frame structure of a washing machine. Substantially all of the parts of the crank case and transmission assembly are die-cast or formed by stamping operations, certain of the die-castings being cast around portions of stampings so as to positively unite the respective pieces. The only parts necessary to be machined are shafts, certain bearings and threaded members, these parts being by far the minimum number of those required.

The entire crank case and transmission unit is composed of such economical parts and may be assembled so readily that it is quite feasible to exchange a new unit for a unit that has become out of order, leaving the new unit with the user of the machine, if within the time of the guarantee, and sending the old unit back to the factory.

The sealed-in crank case contains a quantity of lubricant which is entirely sufficient for adequately lubricating the transmission for a considerable length of time. A vent opening is also provided in the event gas from the lubricant is developed, and this vent opening is so constructed that the entire crank case may be inverted without the loss of lubricant.

While some of the more salient features, characteristics and advantages of the present invention have been above pointed out, others will become apparent from the following disclosures taken in conjunction with the accompanying drawings which illustrate a preferred embodiment of the invention.

On the drawings:

Figure 1 is a fragmentary central vertical sectional view, with parts shown in elevation, of a washing machine structure equipped with a crank case and transmission assembly embodying principles of this invention.

Figure 2 is an enlarged fragmentary plan sectional view of the structure shown in Figure 1 taken substantially as indicated by the line II—II of Figure 1, looking in the direction of the arrows.

Figure 3 is a fragmentary transverse vertical sectional view taken substantially as indicated by the line III—III of Figure 2.

Figure 4 is a plan sectional view taken substantially as indicated by the line IV—IV of Figure 1.

Figure 5 is a greatly enlarged transverse vertical sectional view, with parts in elevation, parts broken away and parts omitted, taken substantially as indicated by the line V—V of Figure 4.

Figure 6 is an enlarged vertical sectional view, with parts in elevation, taken substantially as indicated by the line VI—VI of Figure 4.

Figure 7 is a greatly enlarged fragmentary vertical sectional view, with parts in elevation, taken substantially as indicated by the line VII—VII of Figure 4.

Figure 8 is a plan sectional view of the nature of Figure 2, but taken upon a lower plane, and illustrating in plan the upper face of the lower clutch member seen in Figure 3.

Figure 9 is a fragmentary vertical sectional view, with a part in elevation, taken substantially as indicated by the line IX—IX of Figure 8.

*The construction in general*

The illustrated embodiment of the present invention is shown in operative association with a washing machine of a type designed for household use. This washing machine includes a structural frame member 10, upon which is seated a tub 11. Around the tub is disposed a housing 12.

The transmission assembly is mainly contained within a crank case including a top 13 and a bottom 14 which are sealed together by means of a peripheral lock seam 15, or by any other suitable means the top 13 having a laterally extending flange around which the upper margin of the bottom 14 is folded to form the lock seam. Each part of the crank case may readily be formed by a simple stamping operation out of some suitable material such as sheet steel.

Projecting through the crank case top adjacent one end thereof (Figure 1) is a hollow bushing 16 having a reduced threaded portion 17 which extends through a suitable aperture in the horizontal portion of the frame 10. A shaft 18 extends upwardly from without the threaded portion 17 inside the housing 12 and is connected at its upper end to drive the usual wringer mechanism, not shown in the drawings. A hollow nut 19 is threadedly engaged with the end 17 of the bushing 16 around the shaft 18, there being a suitable gasket between the nut 19 and the frame 10, which effectively, though removably, unites this end of the crank case assembly with the frame structure. The bushing 16 is preferably formed by a simple die-casting operation, while the shaft 18 is preferably the usual form of steel shafting.

Another hollow die-cast bushing 20 extends through the crank case cover adjacent the opposite end thereof, and this bushing is flanged to seat against the underside of the frame member 10. This bushing is preferably provided with a pair of oppositely disposed integral ears 21 (Figures 1, 2, and 3), which ears are suitably apertured to accommodate stud bolts 22 to directly attach the bushing to the frame. A reduced threaded portion 23 extends upwardly from the bushing 20 through suitable apertures in both the frame member 10 and the bottom of the tub 11, and this threaded part is engaged by a die-cast bearing nut 24 inside the tub, a suitable gasket being disposed between the lower end of the bearing nut and the bottom of the tub to prevent leakage. As best seen in Figure 3, the upper part of the bushing 20 functions as a bearing for a shaft 25 designed to drive the agitator of the washing machine, not shown in the drawings, the bushing being cast with a groove 26 therein to lessen the weight. The upper portion of the shaft 25 (Figure 1) finds a suitable bearing inside the bearing nut 24.

In all of the die-castings utilized in connection with the present invention, a suitable and economical casting metal is used. Consequently, such metal provides adequate bearing surfaces for a shaft of the character of the shaft 25, all shafting, of course, being preferably the usual form of steel shafting.

In the foregoing manner, the crank case and transmission assembly is simply and economically joined to the washing machine structure, and when repairs and replacements are needed in the transmission mechanism, it is a simple expedient to remove the entire assembly as a unit from the washing machine by merely disengaging the nut 19, the bearing nut 24, and the two stud bolts 22, the easy removal of the tub 11 providing access to the latter. The entire crank case and transmission assembly may then be exchanged for another assembly in proper working condition readily attachable to the machine as above described, with a minimum loss of operating time for the machine.

*Crank case and transmission assembly in general*

As above mentioned, most of the transmission mechanism is enclosed within the sealed crank case. This mechanism may, however, be put together from the initial pieces into a plurality of sub-assemblies, and each of these sub-assemblies may be installed substantially bodily or as a unit to make up the entire transmission assembly.

Included in the transmission assembly is the main drive sub-assembly which is disposed transversely in the crank case, and which is arranged to actuate a driving gear associated with the wringer drive sub-assembly. This latter sub-assembly operates the aforesaid shaft 18 which in turn drives the wringer mechanism. Also associated with the main driving gear is a pitman and rack assembly, the pitman being eccentrically attached to the driving gear and arranged to reciprocate the rack which in turn provides an oscillating movement for the aforesaid shaft 25 which drives the agitator of the machine.

Main drive sub-assembly

The main drive sub-assembly includes a die-cast bearing member 27, which as seen best in Figures 4 and 5, is designed adjacent each end thereof to function as a bearing for a shaft 28. A worm gear 29 is keyed at an intermediate point to the shaft 28, and the casting 27 is so formed as to provide substantially a semi-circular housing 30 around the worm gear. The shaft is preferably of a different size on each side of the worm gear, being of larger diameter on the right hand side of the gear than on the left hand side, as seen in Figure 5.

At one end thereof, the shaft 28 terminates inside the casting 27 and this end of the casting is closed by a screw-threaded bearing plug 31 flanged or provided with a lock nut as at 32 to overlie the end of the casting. The end of the shaft is notched or countersunk, as indicated at 33, to accommodate a ball 34, thereby providing a thrust bearing for the shaft.

The casting 27 is provided with an enlarged head 35 at the opposite end thereof which surrounds a packing gland pocket 36. A die-cast shouldered bushing 37 is press-fitted into the pocket 36. Press-fitted into the outer end of this bushing is a cover plate 38 suitably apertured to accommodate a reduced end of the shaft 28 which projects therethrough. Disposed around this reduced end of the shaft inside the pocket 36 is a floating bushing 39 held against a shoulder 40 of the shaft 28 by means of a coil spring 41 which abuts the bushing 39 and the cover plate 38. A bellows-like diaphragm 42 having the inner end thereof brazed or otherwise secured to the bushing 39 and the outer end thereof flanged to extend between the cover plate 38 and the first shoulder on the bushing 37, is positioned in spaced relationship around the spring 41 to prevent leakage of lubricant from the crank case. Fixedly secured to the reduced outer end of the shaft outside the crank case is a drive pulley 43 which may be connected in an obvious manner to any suitable source of power, such as an electric motor, not shown in the drawings.

With the exception of the drive pulley 43 and the bearing plug 31 and lock nut 32, the entire main drive sub-assembly just above described may be completely assembled as a unit before disposition in the crank case. On the pulley side of the crank case, the bottom 14 is provided with an aperture sufficiently large to just accommodate the enlarged head 35 of the casting. Around this aperture a holding sleeve 44 is brazed or otherwise secured to the bottom of the crank case at a lateral flange 45. This sleeve 44 is preferably a steel stamping.

On the opposite side thereof, the crank case is provided with an opening sufficiently large to just accommodate the other end of the casting 27. Brazed or otherwise secured to the crank case bottom around this opening is an annular stabilizing member 46.

In placing the unitary sub-assembly in position in the crank case, it is simply necessary to insert the entire casting 27 together with its contents through the sleeve 44, pushing the sub-assembly inwardly until an annular shoulder 47 on the casting 27 contacts the opposite side wall of the crank case bottom, with the smaller end of the casting projecting through this wall. After the casting 27 has been so positioned, the outer marginal portion of the sleeve 44 is spun inwardly as at 48 over the enlarged head 35 of the casting to hold the sub-assembly securely in position within the crank case. The drive pulley 43 may then be connected to one end of the shaft and the ball 34 and bearing plug 31 may then be joined to the opposite ends of the casting 27.

Wringer drive sub-assembly

This sub-assembly includes the aforesaid hollow bushing 16 which contains a relatively large hollow 49 in the upper end thereof, and which hollow is reduced in the lower portion to a size to just accommodate a shaft 50 rotatable within the bushing and bearing against the walls of the bushing. Force-fitted to the upper end of the shaft 50 is a collar 51 of a size to freely fit within the hollow 49 and thus support the shaft. The upper end of this shaft is tortuously shaped as at 52 for an interlocking fit with the lower end of the aforesaid shaft 18 leading to the wringer mechanism, the ends of the shafts 18 and 52 becoming interlocked when the crank case and transmission assembly is attached to the machine.

The lower end of the bushing 16 is provided with a laterally extending flange 53 engaged intimately beneath the top 13 of the crank case. The top 13 is formed with a vertically extending neck 54, through which the upper portion of the bushing projects. The bushing 16 is provided with an annular groove and the neck portion 54 with an annular groove and the neck portion 54 is spun into this groove as indicated at 55 to positively unite the bushing with the crank case cover.

As best seen in Figure 7, the lower end of the shaft 50 is roughened as at 56, and this roughened end is force-fitted into a central aperture in a die-cast driving gear 57 designed to mesh with the aforesaid worm gear 29. This driving gear, as seen best in Figures 4 and 7, is cast around a stamped steel insert 58 to give sufficient strength to the cast gear.

From the foregoing description, it is apparent that the complete wringer drive sub-assembly is supported entirely by the cover 13 of the crank case, and the assembly, with the exception of the shaft 50 and its collar, is completely die-cast. To avoid wear between the bushing 16 and the driving gear 57, a washer 59 is disposed between these two elements around the shaft, this washer being preferably made of Swedish iron.

It is a simple expedient to assemble the entire sub-assembly and then attach the sub-assembly to the cover of the crank case, as indicated at 55.

Pitman and rack sub-assembly

This sub-assembly may also be pre-assembled and is then attached as a unit to the bottom of the crank case. With reference to Figures 1, 4, 6, and 7, it will be seen that the sub-assembly includes a pitman 60 in the form of an inverted channel, preferably a steel stamping. One end of this pitman is eccentrically connected with the aforesaid driving gear 57 by means of a vertical shaft 61 having a reduced end extending through the pitman and secured thereto by means of a nut 62.

The driving gear 57 is provided with an offset aperture therein of a size to accommodate the shaft 61, so that the shaft may easily be slipped into the aperture in the driving gear and be pivotal relatively to the gear. As will later appear, the opposite end of the pitman is pivotally associated with a rack by means of which the aforesaid agitator shaft 25 is oscillated.

Attached to the bottom 14 of the crank case adjacent the opposite end is a stamped steel rack guide 63 which, as seen best in Figures 3 and 4, is angular in shape in its inner portion and channel-shaped adjacent the end of the crank case. The channel portion of the rack guide opens laterally and the top of this portion has a downwardly turned lip 64 (Figure 3) for a purpose that will later appear. Preferably butt-welded to the bottom flange of the rack guide 63 is a pair of stud bolts 65 and 66 respectively, which extend through suitable apertures in the bottom of the crank case. A supporting sleeve 67 (Figures 1 and 6) is disposed around the longer bolt 65 because the crank case is deeper in the region of the bolt 65 than in the region of the bolt 66. Each of the bolts 65 and 66 is tightly joined to the bottom of the crank case by means of a nut 68, there being a suitable lock washer or similar packing element inside each nut to prevent leakage of lubricant around the respective bolt. The rack guide may pivot on the bolt 65, and the bolt 66 has a loose fit in the crank case when the nut is loosened.

A rack 69, toothed as at 70, is positioned for longitudinal reciprocation within the guide 63. This rack is preferably die-cast and is provided with a stamped steel insert 71 (Figure 1) to sufficiently strengthen the rack. A hollow 72 is cast in the rack to lighten it, and a groove 73 (Figures 3 and 4) is provided in the rack for the reception of the downwardly turned lip 64 on the guide 63 so that the rack will not get out of alignment during its reciprocatory motion.

Integrally cast on the inner end of the rack is a bearing housing 74 containing a pivot shaft 75, seen in dotted lines in Figures 4 and 6, which has a reduced lower end extending out of the housing 74 and through the adjacent end of the aforesaid pitman 60 to which it is attached by a nut 76 whereby the pitman may pivot relatively to the housing and the housing acts as a journal or bearing for the pivot shaft. To hold the pivot shaft 75 in position, the housing 74 is provided with a cover 77 overlying the entire upper end of the housing, and through this cover a stud screw 78 is threadedly engaged in the pivot shaft.

From the foregoing description, it is apparent that the entire pitman and rack sub-assembly may be pre-assembled and installed in and to the bottom of the crank case as a unit.

*Agitator drive sub-assembly*

This sub-assembly is secured to and carried by the crank case cover 13. It may substantially all be pre-assembled and attached to the cover prior to the placing of the bottom of the crank case.

The sub-assembly includes the aforesaid bushing 20 in which a relatively large cavity 79 is cast, this cavity or hollow terminating just short of the threaded portion 23, the latter having just sufficient opening therein to accommodate the shaft 25. This bushing 20 is also provided with a lower shoulder 80 (Figure 3) and a depending threaded portion 81 which extends through a suitable aperture in the crank case cover 13, with the shoulder 80 resting on the exterior face of the cover. Another hollow bushing 82 interiorly threaded for connection with the part 81 is also provided with a shoulder 83 similar to the shoulder 80 for engagement with the interior face of the crank case cover. When these two bushings are threadedly connected, the crank case cover is clamped between the shoulders or flanges 80 and 83, firmly joining the sub-assembly to the cover. The bushing 82, which is die-cast, is provided with an interior shaft-bearing portion 84, there being an annular hollow between the bearing 84 and the threaded side wall of the bushing to maintain lightness of structure.

The lower end of the agitator shaft 25 extends downwardly into the hollow upper end of a stud shaft 85, these shafts being rotatable relatively to each other. The agitator shaft 25 is provided with a collar 86 keyed thereto and disposed in the upper end of the cavity 79 of the bushing 20. This collar prevents the shaft 25 from being withdrawn from the sub-assembly in the event clothes being laundered in the tub 11 tend to raise the agitator (not shown) to which the upper end of the shaft 25 is connected.

The stub shaft 85 seats against the crank case bottom in a recess 87 provided for the reception of this shaft. Also seated in the recess 87 is a bearing sleeve 88 for the lower end of the shaft. Immediately above the bearing sleeve a pinion 89 is keyed to the shaft 85, as indicated at 90, this pinion meshing with the teeth 70 on the aforesaid rack 69, whereby both the pinion and shaft 85 are given an oscillatory drive by the reciprocatory movement of the rack (Figures 1, 3, and 4).

A selective drive is provided between the shaft 85 and the shaft 25 by means of a clutch comprising two members. One clutch member 91 is keyed as at 92 to the shaft 25 but is slidable relatively thereto. The other clutch member 93 is die-cast around the upper end of the shaft 85, as best seen in Figures 3 and 9, and must rotate with the shaft. Both the clutch members 91 and 93 are preferably die-castings and similar in construction.

With reference to Figures 5, 8, and 9, more especially the latter, it will be seen that the upper end of the shaft 85 is grooved and shouldered as indicated at 94, and the clutch member 93 is die-cast around the upper end of the shaft to integrally unite these parts. The clutch member carries a stamped steel base 95, a plan view of which is seen in Figure 8, and the base and member are so shaped as to provide alternate recesses 96 and elevations 97. The clutch member 93 is also cast around portions of the facing 95 so as to integrally unite them. In the elevated portions 97 of the face, tongues 98 are struck downwardly and the cast metal extends over these tongues.

Tongues 99 are also struck inwardly from the side walls of the face and the cast metal also surrounds these tongues.

The upper clutch member 91 is provided in similar manner with a stamped steel face 95. Each of these members are arranged to substantially fill the hollow 79 of the bushing 20, but are rotatable inside the bushing. Obviously, one of the clutch members must be movable relatively to the other to selectively engage and disengage the clutch, and in this instance the upper member 91 is slidable on the shaft 25 into and out of engagement with the lower clutch member 93. Upward movement of the clutch member 91 is limited by the collar 86, while the lower clutch member 93 rests upon the bearing part 84 of the bushing 82. Thus, all of the sub-assembly structure, with the exception of the pinion 89 and the bearing sleeve 88, is suspended or carried by the crank case cover 13.

When the clutch members are engaged so that the shaft 25 is driven by the shaft 85, the elevated portions 97 of the upper clutch member are disposed in the recesses 96 of the lower clutch member, and vice versa. Of course, easily operable means are provided for selectively moving the upper clutch member into and out of engaged position. These means include a shaft 100 extending into a suitable aperture in a lateral boss 101 formed on the bushing 20. This shaft 100 may be connected to any suitable operating handle, not shown in the drawings. Carried by the shaft and rotatable therewith is a bearing member 102 and an end cap 103, the latter carrying a horizontally extending pin 104 rotatable within a bearing insert 105 in the upper clutch member 91. A cap 106 covers the aperture of the boss 101 (Figures 2 and 3) and is retained in position by means of screws or the equivalent 107. Inside the cap is a felt washer 108 or equivalent packing member to prevent leakage around the shaft. It is therefore apparent that upon a substantially 90 degree rotation of the shaft 100, the upper clutch member will be moved downwardly by means of the pin 104 into engagement with the lower clutch member so that the agitator shaft 25 will be rotated with the stub shaft 85. A swing of the shaft 100 in the opposite direction releases the clutch so that the agitator of the washing machine will not operate even though the drive mechanism is in continuous operation.

In mounting this agitator drive sub-assembly as a unit on the crank case cover 13, the clamping effect of the flanges 80 and 83 upon the cover are not solely relied upon. The lower bushing 82 is provided with a pair of laterally extending ears 109 on its flange 83 (Figures 1, 2, and 6). Each of these ears is apertured to accommodate a split rivet fastening element 110 or the equivalent, by means of which the bushing 82 is securely fastened to the cover 13 of the crank case.

When the crank case and transmission assembly is put together and the agitator drive sub-assembly is secured to the crank case cover, the bearing sleeve 88 will be seated in the socket 87 at the bottom of the crank case. The pinion 89 will be slid onto the shaft 85, and when the bottom of the crank case is brought into association with the cover, the bearing sleeve 88 will be slid over the shaft, holding the parts together until the lock seam 15 between the cover and the bottom of the crank case has been formed. After this has been accomplished, the stud screws 22 are put in position to secure the transmission and crank case unit to the frame 10.

*Adjustment and vent details*

In view of the fact that the agitator of a washing machine is subjected to the highest load, the teeth 70 of the rack 69 which indirectly actuates the agitator through the pinion 89 may become worn, and simple means are provided to compensate or make up for the wear of the teeth on either the rack or the pinion. With references to Figures 3, 4 and 6, it will be seen that these means include a hollow stud 111 riveted to the side wall of the crank case bottom. A stud 112 is threadedly engaged in the rivet 111 and extends inwardly into abutment with the rack guide 63. By means of this stud, the rack guide 63 may be forced over to move the rack into better engagement with the pinion 89, the guide pivoting on the bolt 65, and the loose fit of the bolt 66 permitting the adjustment when the respective nut is loosened. A lock nut 114 holds the stud 112 in any desired position of adjustment.

In view of the fact that the sealed-in crank case contains a substantially permanent supply of lubricant, and gas might develop in the event the lubricant should become heated, a vent tube 115 (Figure 6) is secured in a suitable manner upon the cover 13 of the crank case. This tube extends down quite a distance into the crank case, so that if the crank case and transmission assembly unit is inverted during shipment or at some other time, the lubricant will not flow out of the crank case through the vent opening.

From the foregoing, it will be apparent that a new and novel method is involved in the making and assembling of my crank case and transmission unit. The various sub-assemblies hereinabove mentioned may be easily assembled and installed as a unit in the crank case. Assuming that the various sub-assemblies have been pre-assembled, it is simply necessary to attach the wringer drive sub-assembly and the agitator drive sub-assembly to the crank case cover 13 in the manner previously outlined. The main drive sub-assembly and the pitman and rack sub-assembly are attached to the crank case bottom. In addition, the crank case bottom in the recess 87 carries the bearing sleeve 88. It is then a simple expedient to place the crank case cover on the crank case bottom after slipping the pinion 89 on the shaft 85. This shaft will thereupon seat in the recess 87 extending through both the pinion and the bearing sleeve 88, and the pinion will be in mesh with the rack 69. Likewise, the driving gear 57, the stub shaft 61 to which the pitman 60 is connected. Then the upper margin of the bottom 14 is folded over the lateral flange on the cover 13 to form the lock seam 15 and seal the cover and bottom of the crank case together. A sufficient amount of lubricant may then be placed in the crank case through the vent tube 115 or through another opening which may be provided for that purpose and to function as a drain, if so desired.

The entire unit may then be attached to the washing machine structure in the manner outlined hereinabove.

It will further be noted that substantially all of the parts of the transmission and crank case are simple metal stampings or die-castings, there being very few parts, such as shafts and threaded members, necessitating machining operations in their construction. The entire construction is so economical that, rather than endeavor to have a repair man correct any trouble that may develop while the unit is on the machine, it is feasible to merely remove the unit, exchange it for another unit and attach the new unit to the machine, thereby eliminating repair expenses and minimizing considerably the time in which the machine must stand idle.

I am aware that many changes may be made and numerous details of construction may be varied through a wide range without departing from the principles of this invention, and I, therefore, do not purpose limiting the patent granted hereon otherwise than is necessitated by the prior art.

I claim as my invention:

1. A crank case assembly for a clothes washing machine comprising cover and bottom casing portions both formed from sheet metal and having cooperating flanged portions secured together, a wringer drive assembly including a rotatable gear supported by the cover portion, an agitator drive assembly including a pinion, supported by the cover portion, a sub-assembly supported by the bottom portion and attachable to the wringer drive assembly and to the agitator assembly as the bottom and cover are assembled, and a drive shaft mounted in said bottom portion and having a gear adapted to be brought into mesh with the gear of the wringer drive assembly as the bottom and cover are brought together.

2. In a washing machine of the character described, a transmission casing comprising an upper sheet metal casing portion and a bottom sheet metal casing portion secured at its edges to the upper casing portion, agitator drive means in said transmission casing, wringer drive means in said casing, means connecting said wringer drive means to said agitator drive means for simultaneous operation, an operating shaft for driving said wringer drive means, and a bearing member rotatably supporting said last named shaft and having an extended area of attachment with opposite sides of said bottom casing portion.

3. In a washing machine of the character described, a transmission casing comprising an upper sheet metal casing portion, a bottom sheet metal casing portion secured at its edges to said upper portion, a wringer operating shaft having a driving gear in said casing, a bearing member fixed to said upper casing portion and rotatably mounting said wringer operating shaft, reciprocating means, an agitator shaft oscillatable in said upper casing portion and operated by said reciprocating means, means connecting said reciprocating means to said driving gear of the wringer operating shaft, a drive shaft for driving said driving gear, and a rigid bearing member supporting said drive shaft for rotation on said bottom casing portion and having opposed portions secured to opposite sides thereof.

4. In a washing machine of the character described, a transmission casing comprising an upper sheet metal casing portion and a bottom casing portion secured thereto, operating mechanism in said transmission casing, and drive means for said operating mechanism including a horizontally extending shaft having a portion projecting from said casing and adapted to be power driven, and a bearing member for said shaft secured at opposite ends thereof to opposite sides of the bottom casing portion, said bearing member and said shaft being adapted for insertion together as a unit into said bottom casing portion.

5. In a washing machine of the character described, a transmission casing comprising an upper sheet metal casing portion and a bottom casing portion secured thereto, operating mechanism in said transmission casing, and drive means for said operating mechanism comprising a shaft, a worm on said shaft, bearing means for opposite ends of said shaft and including end portions and a middle portion rigidly interconnecting said end portions and extending around said worm gear, said end portions having extended areas of engagement with opposite sides of said bottom casing portion.

6. In a washing machine of the character described, a transmission casing comprising an upper sheet metal casing portion and a bottom casing portion secured thereto, operating mechanism in said transmission casing, and drive means for said operating mechanism comprising a bearing member extending integrally from one side of the lower casing portion to the other side of said portion and having a shaft receiving passage, a drive shaft rotatably mounted in said passage and projecting from one end of the transmission casing for operation from a driving source, and gear means on said shaft and within said transmission casing.

7. In a washing machine of the character described, a transmission casing comprising an upper sheet metal casing portion and a bottom casing portion secured thereto, operating mechanism in said transmission casing, and drive means for said operating mechanism comprising an operating shaft, a gear on said shaft, bearing means rotatably supporting spaced portions of said shaft, means fixing said bearing means together and extending around said gear but exposing one side of said gear.

8. In a washing machine of the character described, a crank case assembly mountable as a unit to a washing machine, said assembly comprising an upper sheet metal stamping, a bottom sheet metal stamping lock-seamed to the upper stamping, transmission mechanism operably mounted on said upper stamping, additional transmission mechanism operably mounted on said bottom stamping, a drive shaft for said transmission mechanism and having a portion extending out for attachment to a power source, and bearing means rotatably mounting said shaft and providing a rigid spacing connection between opposite sides of said bottom stamping.

9. The method of making a crank case and transmission assembly for washing machines and the like comprising stamping a cover from sheet metal, stamping a bottom from sheet metal, assembling transmission mechanism into the cover, assembling transmission mechanism into the bottom, assembling an operating shaft in its bearing and then assembling the bearing with the shaft contained therein into the bottom, and bringing the top and bottom together to enclose the transmission mechanism in a crank case and to engage several different elements of the transmission mechanism with one another by the act of bringing the top and bottom together, and connecting engaging portions of the cover and bottom.

10. The method of making a crank case and transmission assembly for washing machines and the like comprising stamping a crank case section from sheet metal to form a cover, stamping a second crank case section from sheet metal to form a bottom, assembling transmission mechanism into the cover, assembling transmission mechanism into the bottom, assembling an operating shaft in a bearing, inserting the bearing from one side to the other of one of said sections and securing the bearing to opposed walls of such section, bringing the top and bottom together to enclose the transmission mechanism in a crank case and to engage different elements of the transmission mechanism with one another merely by the act of bringing the top and bottom together, and lock seaming engaging portions of the cover and bottom.

LELAND G. KNAPP.